(12) United States Patent
Schneider et al.

(10) Patent No.: US 7,350,807 B2
(45) Date of Patent: Apr. 1, 2008

(54) DIVIDED AIRBAG SYSTEM

(75) Inventors: David W. Schneider, Waterford, MI (US); Changsoo Choi, Rochester, MI (US); Timothy A. DePottey, Flint, MI (US); Curtis W. Strader, Davidson, MI (US)

(73) Assignee: Autoliv ASP, Inc., Ogden, UT (US)

( * ) Notice: Subject to any disclaimer, the term of this patent is extended or adjusted under 35 U.S.C. 154(b) by 181 days.

(21) Appl. No.: 11/136,909

(22) Filed: May 25, 2005

(65) Prior Publication Data

US 2006/0267323 A1 Nov. 30, 2006

(51) Int. Cl.
*B60R 21/16* (2006.01)
(52) U.S. Cl. .................... 280/732; 280/743.2
(58) Field of Classification Search ............ 280/743.2, 280/743.1, 729, 732
See application file for complete search history.

(56) References Cited

U.S. PATENT DOCUMENTS

| | | | | | |
|---|---|---|---|---|---|
| 5,129,675 | A | * | 7/1992 | Wang | 280/743.1 |
| 5,310,214 | A | * | 5/1994 | Cuevas | 280/729 |
| 5,945,184 | A | | 8/1999 | Nagata et al. | 280/743.2 |
| 6,454,300 | B1 | * | 9/2002 | Dunkle et al. | 280/742 |
| 6,536,800 | B2 | * | 3/2003 | Kumagai et al. | 280/743.1 |
| 6,749,217 | B2 | | 6/2004 | Damian et al. | 280/743.1 |
| 6,832,780 | B2 | * | 12/2004 | Amamori | 280/743.2 |
| 7,000,947 | B2 | * | 2/2006 | Kumagai et al. | 280/743.1 |
| 7,131,664 | B1 | * | 11/2006 | Pang et al. | 280/743.2 |
| 7,152,880 | B1 | * | 12/2006 | Pang et al. | 280/743.2 |
| 7,192,053 | B2 | * | 3/2007 | Thomas | 280/739 |
| 2001/0033072 | A1 | * | 10/2001 | Kumagai et al. | 280/730.1 |
| 2002/0063416 | A1 | * | 5/2002 | Kamaiji et al. | 280/728.2 |
| 2002/0175511 | A1 | * | 11/2002 | Dunkle et al. | 280/743.2 |
| 2003/0230883 | A1 | | 12/2003 | Heym | 280/743.1 |
| 2004/0164526 | A1 | | 8/2004 | Hasebe et al. | 280/743.2 |
| 2005/0035582 | A1 | | 2/2005 | Kim | 280/743.2 |
| 2005/0077708 | A1 | * | 4/2005 | Sollars | 280/729 |
| 2005/0098994 | A1 | * | 5/2005 | Matsumura | 280/743.1 |
| 2005/0161918 | A1 | * | 7/2005 | Bito | 280/732 |
| 2006/0028009 | A1 | * | 2/2006 | Hasebe et al. | 280/743.1 |
| 2006/0049618 | A1 | * | 3/2006 | Bito | 280/732 |
| 2006/0103118 | A1 | * | 5/2006 | Hasebe | 280/729 |
| 2006/0186647 | A1 | * | 8/2006 | Bosch | 280/729 |
| 2006/0197318 | A1 | * | 9/2006 | Choi et al. | 280/729 |
| 2006/0249934 | A1 | * | 11/2006 | Hasebe | 280/729 |
| 2006/0267323 | A1 | * | 11/2006 | Schneider et al. | 280/743.1 |
| 2007/0024032 | A1 | * | 2/2007 | Hasebe | 280/729 |
| 2007/0040358 | A1 | * | 2/2007 | Kismir | 280/728.2 |
| 2007/0182143 | A1 | * | 8/2007 | Wright | 280/743.2 |
| 2007/0200320 | A1 | * | 8/2007 | Keshavaraj | 280/730.1 |
| 2007/0262572 | A1 | * | 11/2007 | Fischer et al. | 280/730.1 |

FOREIGN PATENT DOCUMENTS

| | | | |
|---|---|---|---|
| JP | 2001 030863 | | 6/2001 |
| JP | 2005/247118 | * | 9/2005 |
| JP | 2005-280470 | * | 10/2005 |

\* cited by examiner

*Primary Examiner*—Paul N. Dickson
*Assistant Examiner*—Karen J. Amores
(74) *Attorney, Agent, or Firm*—Sally J Brown; Stoel Rives, LLP

(57) ABSTRACT

An airbag assembly is disclosed. The airbag assembly includes an inflatable cushion having a recess in its lower portion. The recess may form split sections in the lower portion of the cushion. The recess may be configured to receive a rear-facing child car seat during deployment. The airbag assembly may further include a tethering system to control deployment of the split sections of the cushion.

14 Claims, 6 Drawing Sheets

DIVIDED AIRBAG SYSTEM

TECHNICAL FIELD

The present disclosure relates generally to the field of automotive protective systems. More specifically, the present disclosure relates to passenger airbag systems designed to minimize interaction with vehicular occupants in child car seats.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the invention's scope, the embodiments will be described and explained with specificity and detail in reference to the accompanying drawings in which:

DETAILED DESCRIPTION OF PREFERRED EMBODIMENTS

It will be readily understood that the components of the embodiments as generally described and illustrated in the Figures herein could be arranged and designed in a wide variety of different configurations. Thus, the following more detailed description of various embodiments, as represented in the Figures, is not intended to limit the scope of the invention, as claimed, but is merely representative of various embodiments. While the various aspects of the embodiments are presented in drawings, the drawings are not necessarily drawn to scale unless specifically indicated.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together.

Figure 1:
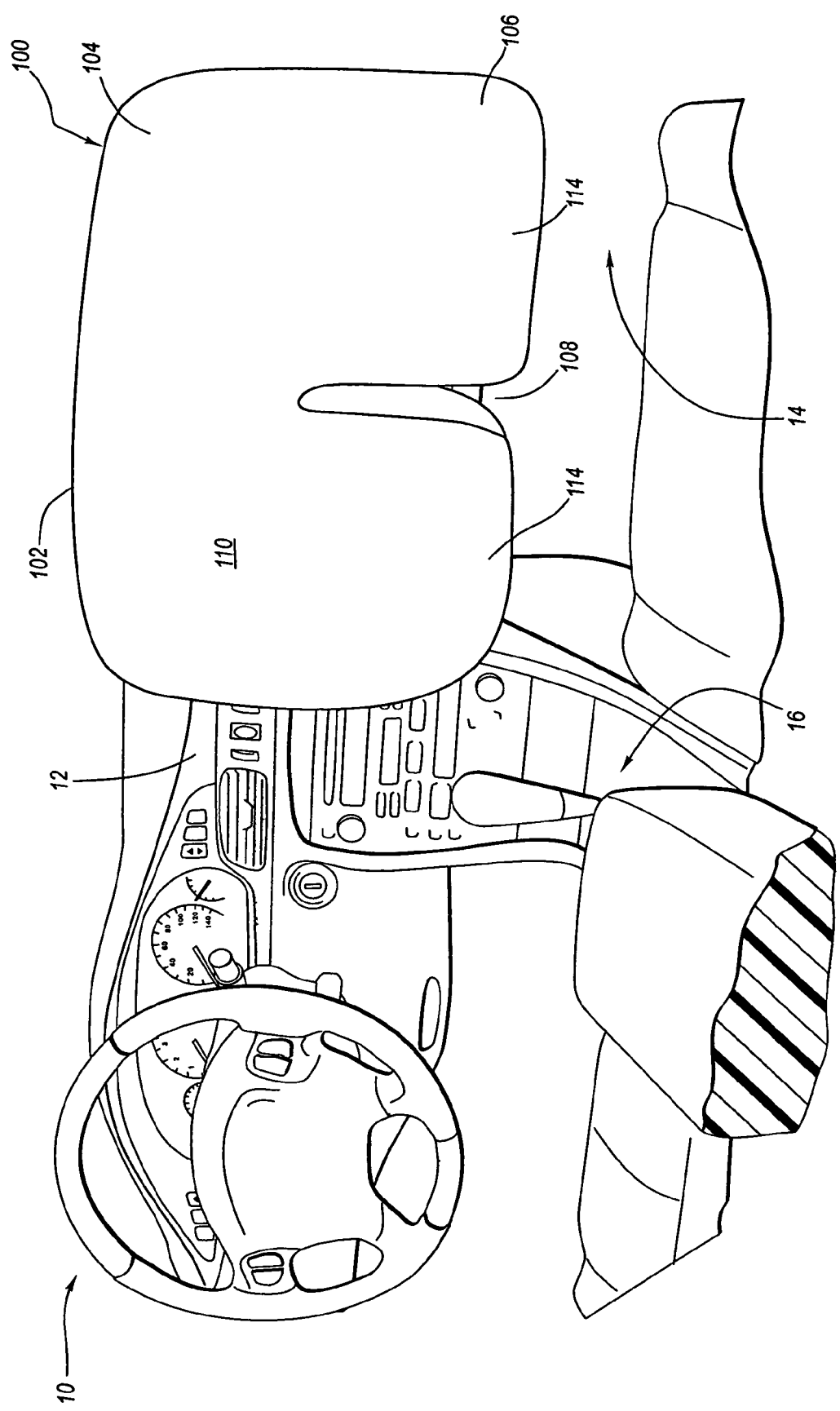
FIG. 1 is a perspective view from inside a vehicle of one embodiment of a passenger-side airbag in a deployed state.

FIG. 1 represents one embodiment of an airbag 100 in a deployed state, as shown from a perspective view from inside a vehicle 10. The airbag 100 may be a passenger-side airbag 100 that is configured to deploy from an instrument panel 12. The airbag 100 is an inflatable cushion 102 that is configured to be rapidly inflated by an inflator (not shown), such as a pyrotechnic inflator. The inflator rapidly produces inflation gas to fill the inflatable cushion 102 when activated by a collision sensor system (not shown).

According to the embodiment depicted in FIG. 1, the cushion 102 has an upper portion 104 and a lower portion 106. The upper portion 104 of the cushion 102 is the portion of the cushion 102 closest to the headliner of the vehicle 10 when the airbag 100 is in its deployed state. The lower portion 106 is below the upper portion 104 when the airbag 100 is in its deployed state, and is closest to the floor of the vehicle 10. The term "lower portion" is not necessarily limited to the portion of the cushion 102 that is below a horizontal medial plane of the cushion 102, but may include less than half, more than half or exactly half of the bottom portion of the airbag 100. The term "upper portion" is also not necessarily limited to the portion of the cushion 102 that is above a horizontal medial plane of the cushion 102, but may include less than half, more than half or exactly half of the top portion of the airbag 100.

Disposed in the lower portion 106 of the cushion 102 is a recess 108 that may extend through the entire cushion 102, from its front face 110 to a rear face (not shown). Alternatively, the recess 108 may extend from the front face 110 toward the rear, but not extend completely there through. The recess 108, however, does not extend through the entire upper portion 104 of the cushion 102. The recess 108 may be created through a structure, such as stitching in the fabric of the cushion 102.

The recess 108 may be shaped to receive the upper portion of a rear-facing child car seat that is placed in the passenger seat of the vehicle 10, in order to minimize the interaction between an occupant in the child car seat and the deploying cushion 102.

The recess 108 divides the lower portion 106 of the cushion 102 into split sections 114. One of the sections is on the outboard side 14 of the vehicle 10, and the other is on the inboard 16 side of the vehicle 10. The split sections 114 are configured to minimize interaction between the cushion 102 and the head of an occupant in the rear-facing child car seat. This is accomplished by the split sections 114 deploying on either side of the child car seat, and the car seat being received by the recess 108. The deployment of the split portion 114 may optionally be controlled by a tethering system, such as an internal tethering system.

Figure 2:
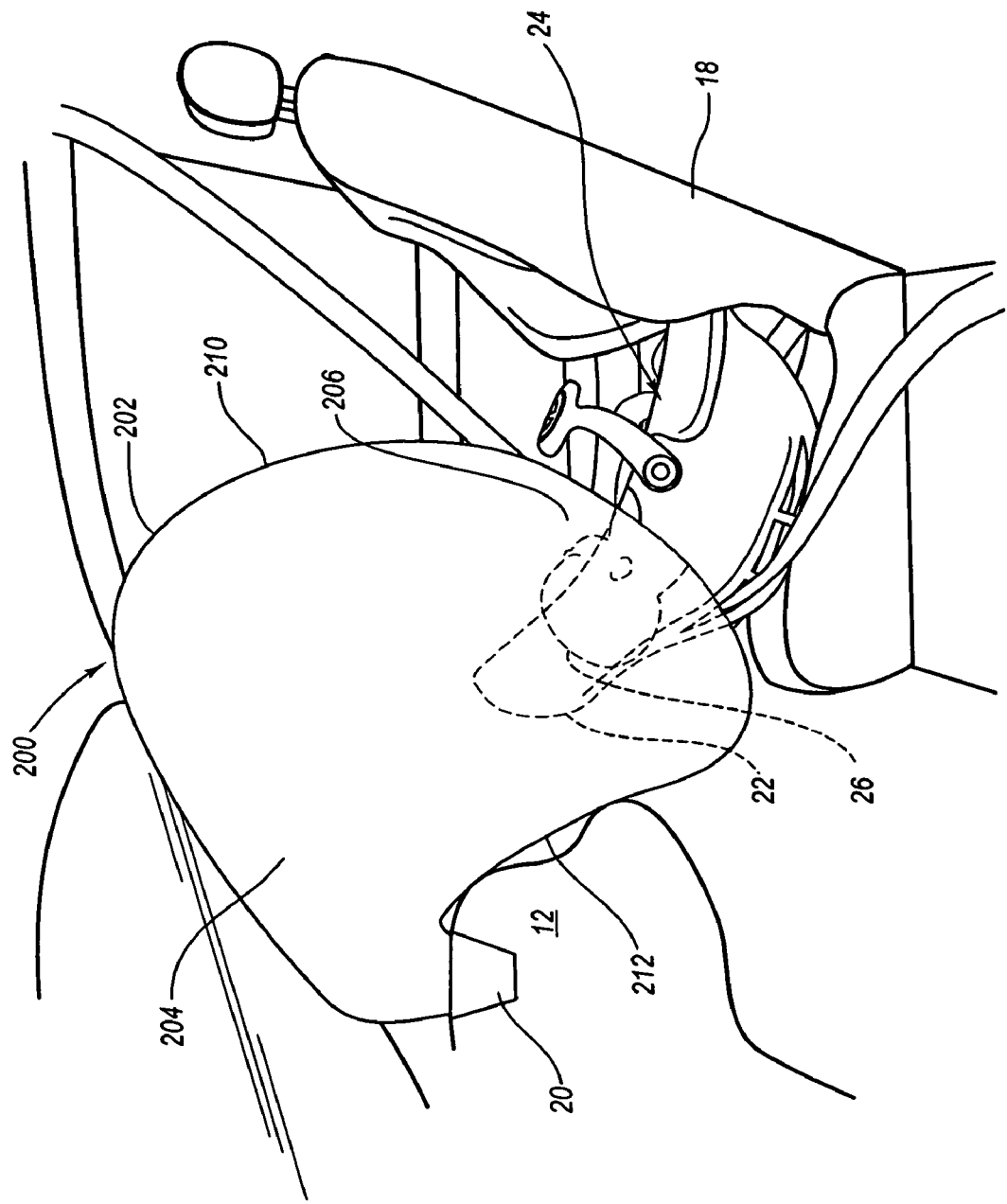
FIG. 2 is a side elevation view from inside a vehicle of another embodiment of a passenger-side airbag in a deployed state.

FIG. 2 represents a passenger-side airbag 200 as shown from a side elevation view in a deployed state. The airbag 200 comprises an inflatable cushion 202 that may deploy out of an instrument panel 12 toward an intended occupant position in a passenger seat 18. The airbag 200 may be stored inside a cavity 20 in the instrument panel 12 when in an uninflated state.

When the inflatable cushion 202 deploys, a recess (not shown in FIG. 2) located in a lower portion 206 of the cushion receives an upper portion 22 of a rear-facing child car seat 24. The recess may extend from a front face 210 of the cushion to a rear face 212. Accordingly, interaction between the cushion 202 and an occupant 26 in the child car seat 24 is minimized because of the location of the recess in the lower portion 206. This may significantly reduce the potential injury to the out-of-position occupant 26. Furthermore, alternative methods known in the art to reduce membrane loading of a deploying cushion 202 may be used in combination with the embodiments disclosed herein, such as a cinch tube, or special cushion folding patterns and the like.

An upper portion 204 of the inflatable cushion 202 does not have a recess disposed there through in order to provide sufficient impact protection for occupants not sitting in a child car seat 24. Furthermore, restricting the recess to the lower portion 206 may help to prevent too much penetration into the cushion 202 and possible occupant strikethrough if the recess existed in the upper portion 204 of the cushion 202.

Figure 3:
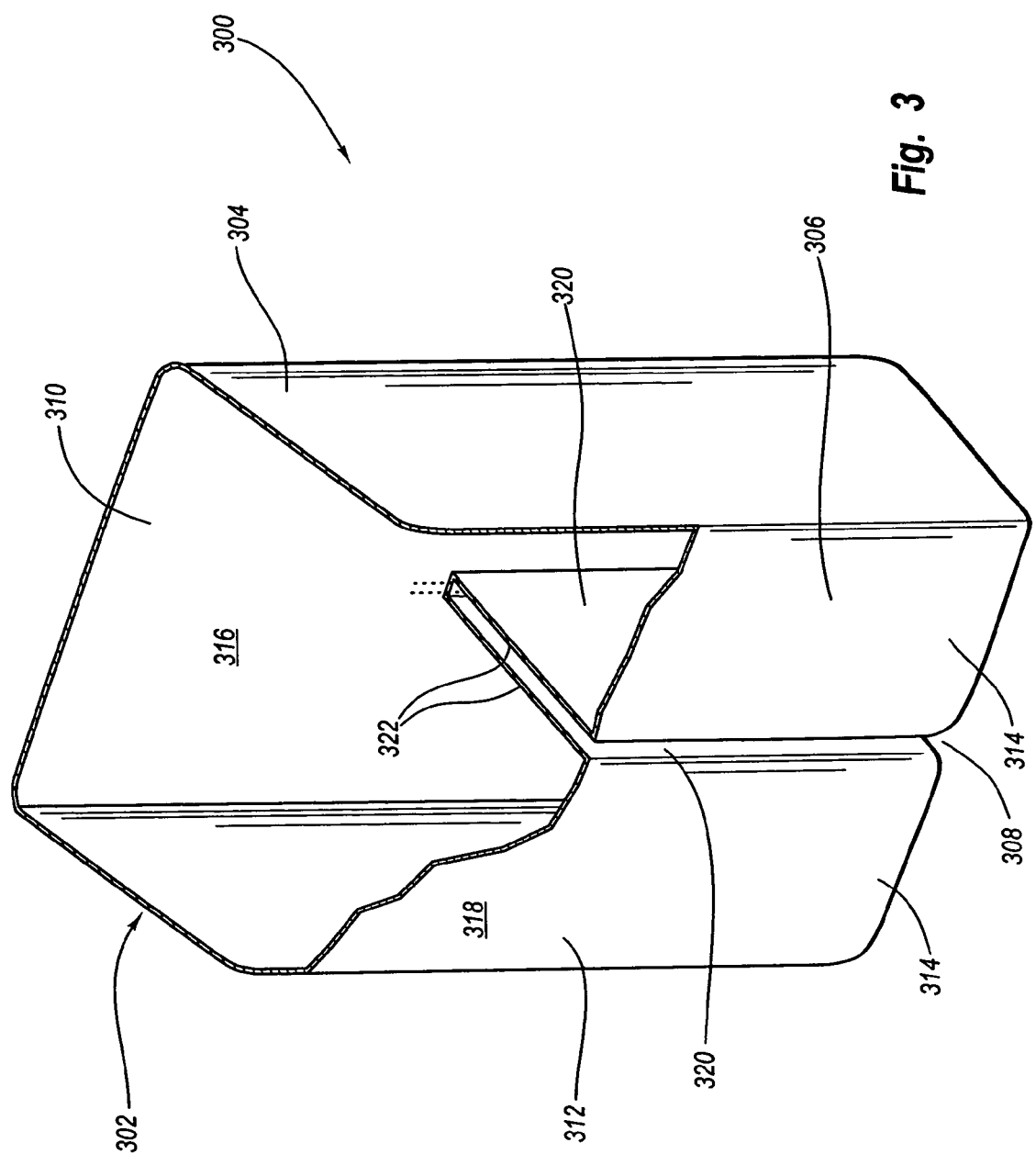
FIG. 3 is a partially-cut away perspective view of one embodiment of a divided airbag.

FIG. 3 represents an embodiment of a divided airbag system 300 from a partially cut-away perspective view. The divided airbag system 300 includes an inflatable cushion 302 that has a front face 310 and a rear face 312. The front face 310 is configured to be closest to an intended occupant position when deployed, whereas the rear face 312 is configured to be closest to an instrument panel when the cushion 302 is deployed.

The front face 310 may include a front panel 316 and the rear face 312 may include a rear panel 318. The panels 316, 318 may be constructed of fabric or alternative construction as known to those having skill in the art. The panels 316, 318 may be separate panels that are attached together through stitching or the like, or alternatively, may be opposite facing portions of a single fabric piece that is sewn together along its sides to form an inflatable cushion.

In a lower portion 306 of the cushion 302, a recess 308 is formed, extending from the rear panel 318 to the front panel 316. The recess 308 defines split sections 314 in the lower portion 306 of the cushion 302. The recess 308 may be formed from a structure, such as divider panels 320 that extend from the base of the cushion 302 towards the cushion top, but terminate before reaching the top, such that an upper portion 304 of the cushion 302 is not divided into split sections. The divider panels 320 may be panels that are attached to the cushion 304 through sewing, bonding, RF welding and the like, or alternatively, may be an integral part of the cushion 304 material that is folded and attached in such a manner as to form the recess 308 in the lower portion 306 of the cushion.

Top edges 322 of each of the divider panels 320 are attached to each other and merged through stitching or through alternative methods of attachment known to those having skill in the art. FIG. 3 shows the top edges 322 before being stitched together. The stitched together top edges 322 define where the recess 308 terminates, and also may comprise part of the structure that defines the recess 308.

The front panel 316 may span across the recess 308, interconnecting the split sections 314 in the lower portion 306 of the cushion 302, while the rear panel 318 may not span the split sections 314. Alternatively, the front panel may be shaped to allow the recess 308 to run there through, similar to the embodiment discussed in conjunction with FIG. 1.

Figure 4:
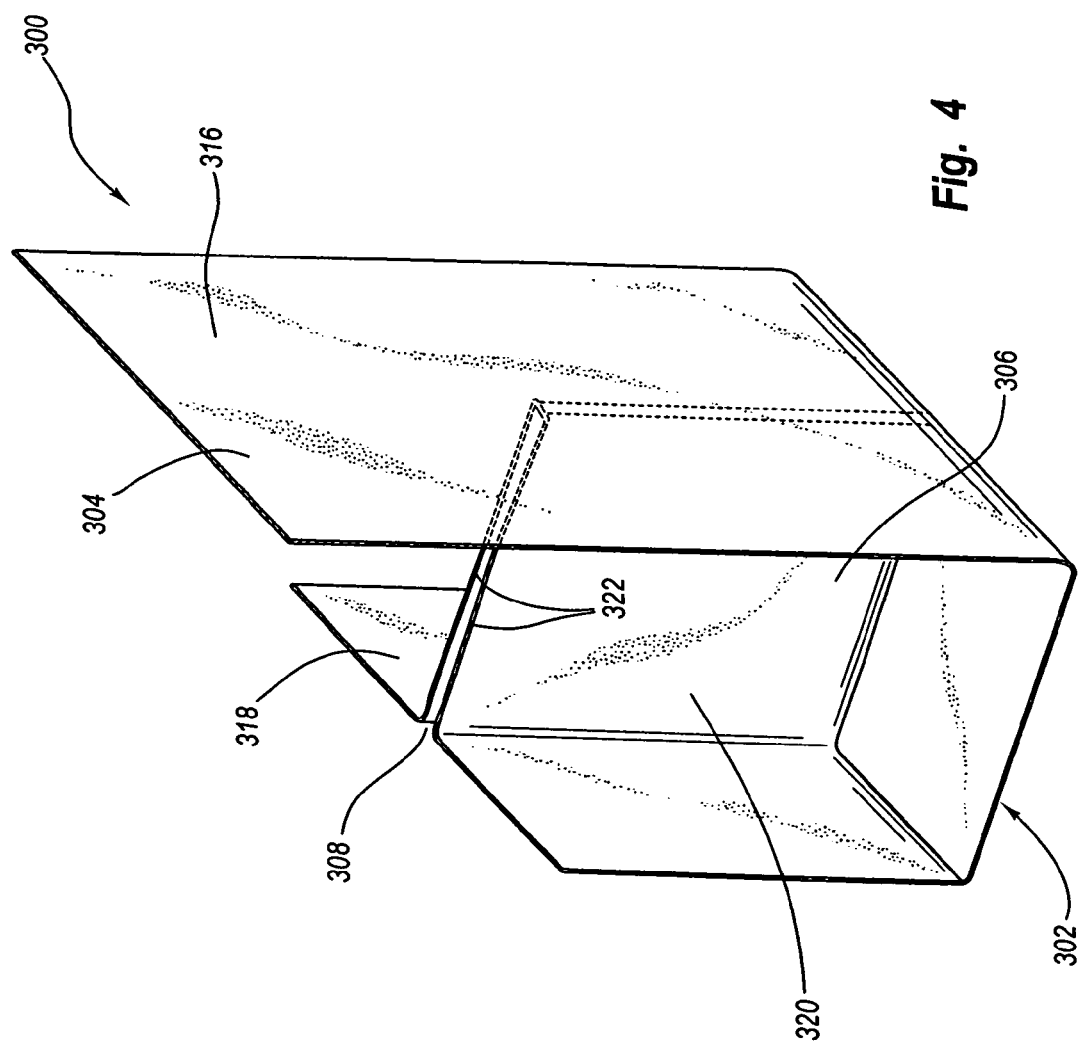
FIG. 4 is an alternative partially cut-away perspective view of the divided airbag of FIG. 3.

FIG. 4 represents the divided airbag system 300 of FIG. 3, shown from an alternative partially cut-away perspective view. The view of FIG. 4 is shown from the perspective of the front panel 316 toward the rear panel 318 absent the sides of the inflatable cushion 302. According to the embodiment depicted in FIG. 4, the front panel 316 is solid and covers the recess 308, such that the recess 308 is disposed behind the front panel 316. In other embodiments the recess 308 may extend through the front panel 316.

The divider panels 320 that define the recess 308 may be attached to the front panel 316 through various types of fastening mechanisms, such as through stitching. The top edges 322 of the divider panels 320 may also be merged through stitching to limit the recess 308 to the lower portion 306 of the cushion 302, i.e., so that the recess 308 does not extend completely through the upper portion 304 and divide the cushion 302 completely in half.

Figure 5:
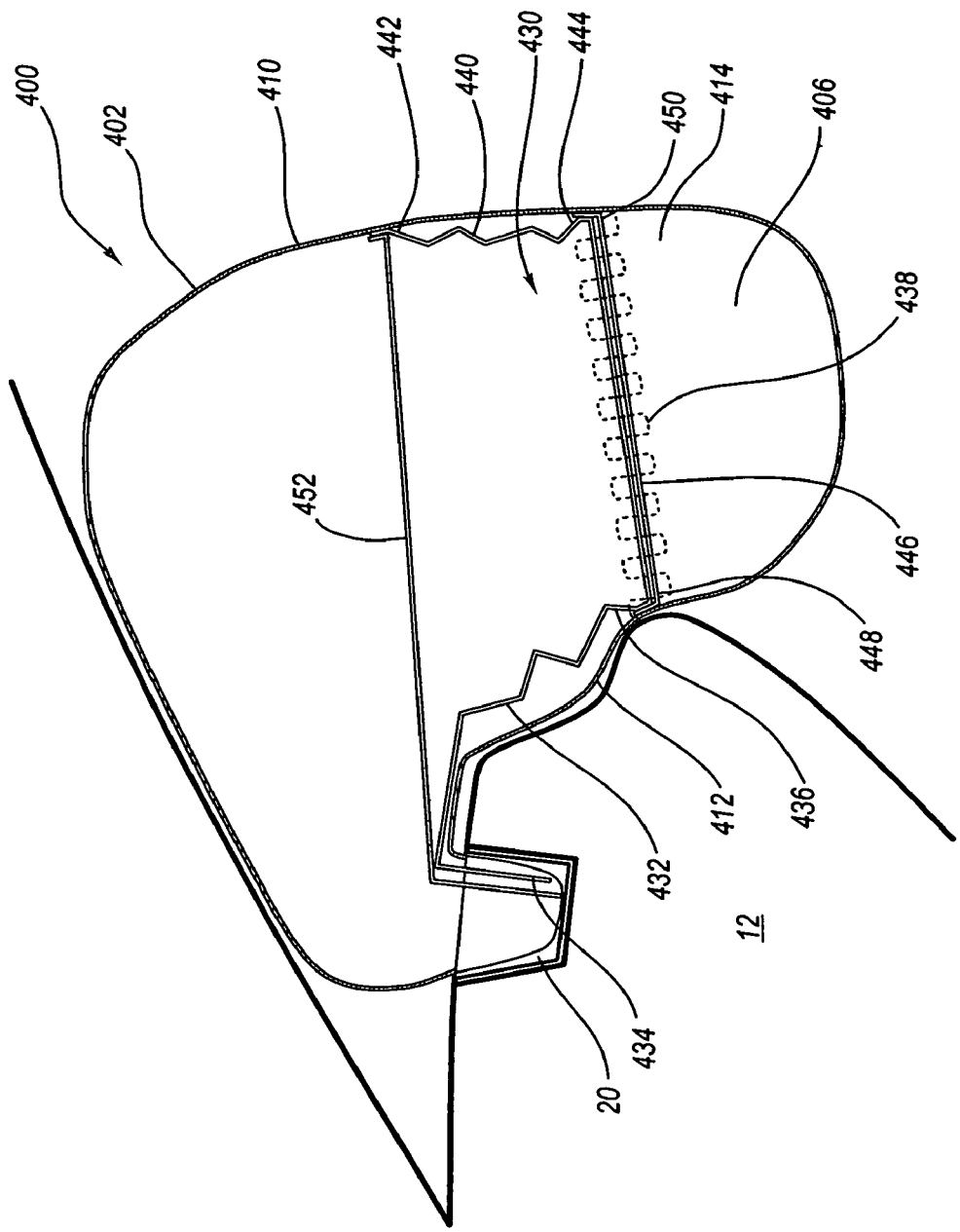
FIG. 5 is a side cross-sectional view of an embodiment of an airbag assembly in a deployed state.

FIG. 5 represents an embodiment of an airbag assembly 400 in a deployed state as shown from a side cross-sectional view. The airbag 400 comprises an inflatable cushion 402 that may deploy out of an instrument panel 12 toward an intended occupant position that may be in a passenger seat. The airbag 400 may be stored inside a cavity 20 in the instrument panel 12 when in an uninflated state.

As discussed in the embodiments heretofore described, the cushion 402 has a recess (not shown) in its lower portion 406. The recess is configured to receive a portion of a rear-facing child car seat once the cushion 402 is inflated. The recess also defines split sections 414 (shown below stitching 438) in the lower portion 406 of the airbag cushion 402. In order to control the deployment of the inflating cushion 402, and particularly the inflation of the split sections 414 in the lower portion 406, the airbag assembly 400 may include a tethering system 430.

The tethering system 430 may be an internal tethering system, such that the tethers used to control the deployment of the cushion 402 are located in the interior of the cushion 402. Alternatively, tethers external to the cushion 402 could be used, or a combination of internal tethers and external tethers. Furthermore, according to other embodiments, the cushion 402 may be constructed such that no tethering system is needed.

The tethering system 430 may include a first tether 432. The first tether 432 may be internal to the airbag cushion 402 and may have a first end 434 that is attached adjacent a rear face 412 of the cushion 402. Being attached adjacent the rear face 412 indicates that the first end 434 of the first tether 432 may be attached directly to the rear face 412 through stitching, bonding, RF welding and the like, or alternatively, the first end 434 may be attached to some other structure that is next to the rear face 412 of the cushion 402. The first end 434 of the first tether 432 is attached adjacent the rear face 412 in a location above the split sections 414 disposed in the lower portion 406 of the cushion 402.

The first tether 432 has a second end 436 that is attached adjacent the rear face 414 and adjacent the split section 414. Being attached adjacent the split section 414 indicates that the second end 436 of the first tether 432 may be attached to a portion of the split section 414, or alternatively next to the split section 414, or as depicted in FIG. 5, attached at the point where the split section 414 ends at the stitching 438. The first tether 432 may help control the trajectory of the deploying airbag cushion 402, particularly in helping to keep the bottom or lower portion 406 from bulging downward during deployment.

Referring still to FIG. 5, the airbag assembly 400 may also include a second tether 440. The second tether 440 may also be internal to the airbag cushion 402 and has a first end 442 that may be attached adjacent (including directly to) a front face 410 of the cushion 402. The first end 442 may be attached to the front face 110 at a position above the split sections 414 disposed in the lower portion 406 of the cushion 402.

The second tether 440 has a second end 444 that is also attached adjacent to the front face 410 and adjacent the split section 414. The second end 444 may be attached at the point where the split section 414 ends adjacent the stitching 438. Alternatively, the second end 444 may be attached to a portion of the split section 414, or next to the split section 414 as would be apparent to those having skill in the art. The second tether 440, like the first tether 432, may help control the trajectory of the deploying airbag cushion 402, particularly in keeping the bottom or lower portion 406 from bulging downward during deployment.

The tether system 430 of the airbag assembly 400 may further include a third tether 446. The third tether 446 may be internal to the inflatable cushion 402. The third tether 446 has a first end 448 that may be attached to the rear face 412 adjacent the split portion 414. The first end 448 of the third tether 446 may be attached adjacent the rear face 412 at the same location that the second end 436 of the first tether 432 is located adjacent the rear face 412.

The third tether 446 has a second end 450 that may be attached to the front face 410 adjacent the split portion 414. The second end 450 of the third tether 446 may be attached adjacent the front face 410 at the same location that the second end 444 of the second tether 440 is located adjacent the front face 410. Accordingly, the third tether 446 may interconnect the first and second tethers 432, 440. The third tether 446 may also be attached to or adjacent to the split portions 414 through stitching 438.

The first 432, second 440 and third 446 tethers may be considered first, second and third tether segments. Furthermore, the first 432, second 440 and third 446 tethers may be integrated into a single tether. For example the single tether may have a first end that is equivalent with the first end 434 of the first tether 432 and a second end that is equivalent with the first end 442 of the second tether 440. All other "ends" of each tether may be points where the single tether is attached to the front 410 or rear face 412 of the cushion 402.

Referring still to FIG. 5, the tethering system 430 may also include a fourth tether 452. The fourth tether 452 may be a typical internal tether that may be attached to and interconnects the rear face 412 and the front face 410 above the lower portion 406 of the cushion 402 to control deployment and the shape of the inflated cushion 402. The tethering system 430 may include other tethers or alternative tether configurations from those shown in FIG. 5 as would be apparent to those having skill in the art.

Figure 6:
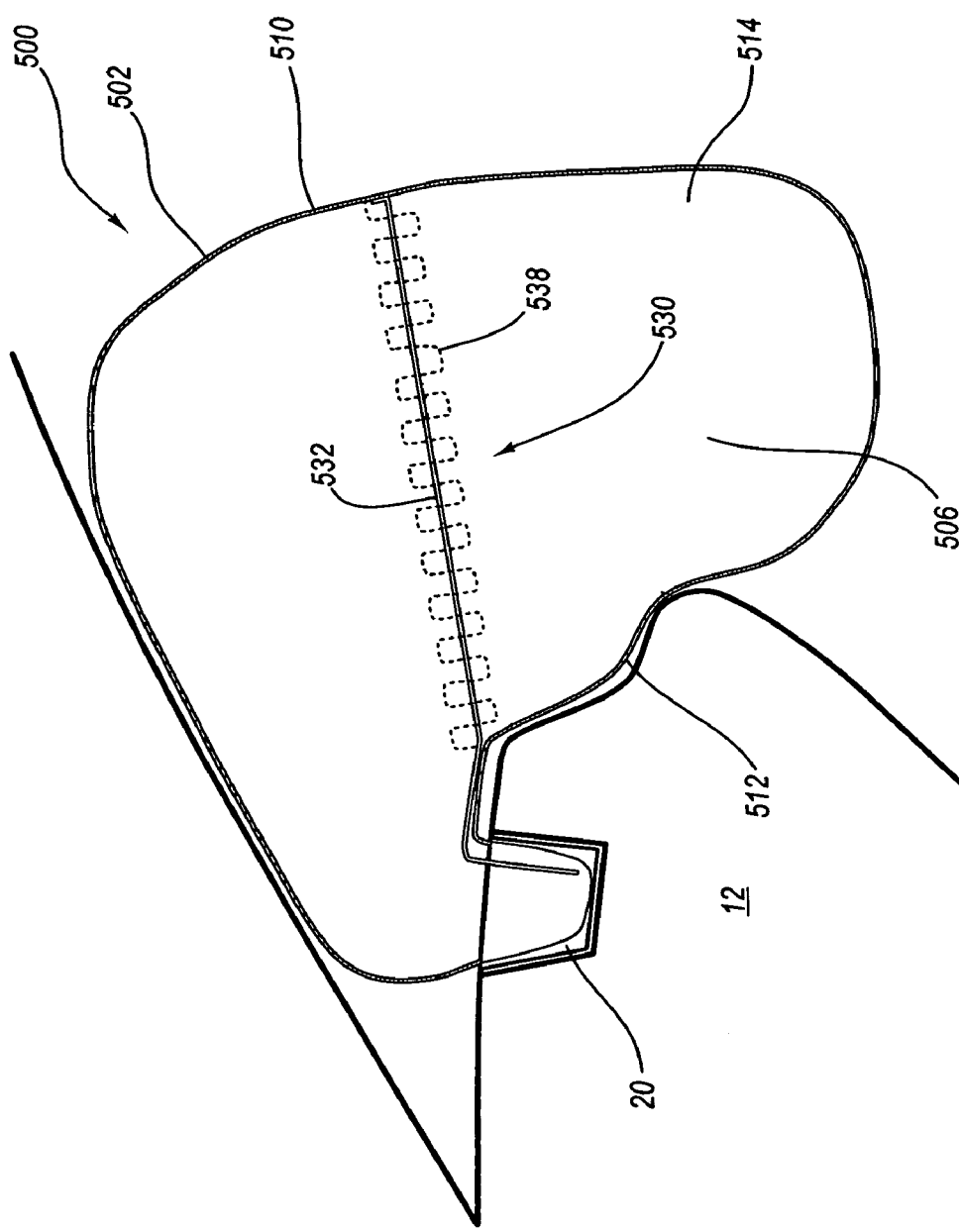
FIG. 6 is a side cross-sectional view of an alternative embodiment of an airbag assembly in a deployed state.

FIG. 6 represents another embodiment of an airbag assembly 500 as shown from a side cross-sectional view in a deployed state. Like the embodiment disclosed in conjunction with FIG. 5, the airbag assembly 500 of FIG. 6 comprises an inflatable cushion 502 that may deploy out of an instrument panel 12 toward an intended occupant position that may be in a passenger seat. The airbag 500 may be stored inside a cavity 20 in the instrument panel 12 when in an uninflated state.

The airbag assembly 500 may include a tethering system 530 that is of an alternative configuration from the tethering system 430 disclosed in conjunction with the embodiment described in FIG. 5. The tethering system 530 may include a first tether 532 that interconnects and is attached to a rear face 512 and a front face 510 of the inflatable cushion 502.

The first tether 532 may extend adjacent split sections 514 in a lower portion 506 of the cushion 502. The first tether 532 may be attached adjacent the split section 514 through a fastener such as stitching 538. The lower portion 506 and split section 514 of the cushion 502 is disposed below the stitching 538. Accordingly, the split section 514 of the embodiment disclosed in FIG. 6 may have an alternative depth than the embodiment disclosed in FIG. 5.

The tethering systems 430, 530 and cushions 102, 202, 302, 402, 502 disclosed provide for a pocket that may receive an upper portion of a rear-facing child car seat, and the head of an occupant seated therein. By having the upper portion of the cushion not divided also provides for adequate restraint and impact protection for properly seated (in-position) occupants.

The airbags and inflatable cushions disclosed herein are examples of means for cushioning a vehicular occupant during a collision event. Furthermore, the divider panels, stitching patterns and recesses of the inflatable cushions disclosed are examples of means for dividing a lower portion of the cushioning means to permit objects such as a rear-facing child car seat to be disposed between divided sections of the cushioning means during deployment. The tethering systems disclosed herein are to be considered examples of tethering means for controlling placement of the receiving means during airbag deployment.

Without further elaboration, it is believed that one skilled in the art can use the preceding description to utilize the invention to its fullest extent. The examples and embodiments disclosed herein are to be construed as merely illustrative and not a limitation of the scope of the present invention in any way. It will be apparent to those having skill in the art that changes may be made to the details of the above-described embodiments without departing from the underlying principles of the invention. In other words, various modifications and improvements of the embodiments specifically disclosed in the description above are within the scope of the appended claims. Note that elements recited in means-plus-function format are intended to be construed in accordance with 35 U.S.C. § 112 ¶6. The scope of the invention is therefore defined by the following claims.

The invention claimed is:

1. An airbag assembly, comprising:
   an inflatable cushion having an upper portion and a lower portion, and a structure formed in the cushion creating a recess in the cushion, such that once inflated, the recess exists in the lower portion of the cushion forming a split section of the cushion in its lower portion,
   wherein the cushion, once inflated, has a front face and a rear face and the recess extends from the front face to the rear face, and an internal tethering system configured red to control deployment of the split section of the cushion,
   wherein the internal tethering system comprises a first tether segment attached adjacent to the rear face of the inflatable cushion above the split section, the first tether segment also attached adjacent to the split section and adjacent to the rear face.

2. The airbag assembly of claim 1, wherein the recess is configured to receive a portion of a rear-facing child car seat once the cushion is inflated.

3. The airbag assembly of claim 2, wherein the split section of the inflatable cushion is configured to minimize interaction between the inflatable cushion and a head of an occupant in the rear-facing child car seat.

4. The airbag assembly of claim 1, wherein the inflatable cushion has a front panel on the front face and a rear panel on the rear face, such that the front panel extends across at least a portion of the recess and interconnects the split section of the cushion.

5. The airbag assembly of claim 1, wherein the internal tethering system further includes a second tether segment attached adjacent to the front face of the inflatable cushion above the split section, the second tether segment also attached adjacent to the split section adjacent to the front face.

6. The airbag assembly of claim 5, wherein the internal tether system further includes a third tether segment extending from the rear face to the front face adjacent to the split section and interconnecting the first and second tether segments.

7. The airbag assembly of claim 1, wherein the inflatable cushion is configured for deployment on a passenger-side of a vehicle.

8. An airbag assembly, comprising:
   an inflatable cushion having an upper portion and a lower portion and a recess formed in the lower portion, such that the inflatable cushion has split sections in its lower portion; and a tethering system that controls deployment of the split sections of the cushion once inflated, the tethering system including a first tether having one end attached to a rear face of the cushion adjacent to the split section and another end attached to the rear face of the cushion above the split sections.

9. The airbag assembly of claim 8, wherein the tethering system further includes a second tether having one end attached to a front face of the cushion adjacent to the split sections and another end attached to the front face of the cushion above the split sections.

10. The airbag assembly of claim 9, wherein the tethering system is an internal tethering system, and further includes a third tether extending adjacent to the split sections and interconnecting the first and second tethers.

11. The airbag assembly of claim 10, wherein the first, second and third tethers are integrated into a single tether.

12. The airbag assembly of claim 10, wherein the tethering system further includes a fourth tether having one end attached to the rear face of the cushion above the split sections and another end attached to the front face of the cushion above the split sections.

13. The airbag assembly of claim 8, wherein the recess extends from a front face of the cushion to the rear face.

14. The airbag assembly of claim 8, wherein the recess is configured to receive a portion of a rear-facing child car seat once the cushion is inflated.

* * * * *